(12) United States Patent
Landsman

(10) Patent No.: US 8,949,943 B2
(45) Date of Patent: *Feb. 3, 2015

(54) MESSAGING SYSTEMS AND METHODS

(75) Inventor: Richard A. Landsman, Scotts Valley, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/597,655

(22) Filed: Aug. 29, 2012

(65) Prior Publication Data

US 2012/0324548 A1   Dec. 20, 2012

Related U.S. Application Data

(63) Continuation of application No. 12/987,609, filed on Jan. 10, 2011, now Pat. No. 8,281,146, which is a continuation of application No. 11/017,461, filed on Dec. 20, 2004, now Pat. No. 7,882,360.

(60) Provisional application No. 60/531,536, filed on Dec. 19, 2003.

(51) Int. Cl.
  *G06F 21/00* (2013.01)
  *H04L 29/06* (2006.01)
  *H04L 12/18* (2006.01)

(52) U.S. Cl.
  CPC .......... *H04L 63/08* (2013.01); *H04L 12/1859* (2013.01); *H04L 63/104* (2013.01)
  USPC ...... 726/4; 726/7; 726/27; 713/157; 713/163; 713/182; 380/255; 709/205; 709/223

(58) Field of Classification Search
  CPC ..... H04L 51/12; H04L 12/585; H04L 12/588; H04L 12/1859; G06F 21/55
  USPC ................... 726/4, 7, 27; 713/157, 163, 182; 709/205, 223; 380/255
  See application file for complete search history.

(56) References Cited

U.S. PATENT DOCUMENTS 4,977,520 A   12/1990   McGaughey, III
5,040,141 A   8/1991    Yazima
(Continued)

FOREIGN PATENT DOCUMENTS

DE   19708856   9/1998
EP      463252   1/1992
(Continued)

OTHER PUBLICATIONS

Wong, Chung Kei et al.. "Secure group communications using key graphs." Networking, IEEE/ACM Transactions on 8.1 (2000): 16-30.*

(Continued)

*Primary Examiner* — Luu Pham
*Assistant Examiner* — Kari Schmidt
(74) *Attorney, Agent, or Firm* — Keller Jolley Preece

(57) ABSTRACT

A third-party can subscribe to one or more electronic message group lists without joining the group lists by creating a trust relationship between the subscriber and a group list member. In particular, the subscriber can send a trust indicator to the group member, who can then determine whether to accept the trust indicator for all or specific groups that are associated with the group member, as appropriate. In at least one embodiment, the group member can send a trust indicator acceptance message to the subscriber that identifies the group member, and any or all group lists associated with the group member. The subscriber can then receive messages directed to the trusted group member or group lists, and can send group messages to the group lists subject to a receive setting associated with the group lists or group members of the group lists.

20 Claims, 6 Drawing Sheets

(56) References Cited

U.S. PATENT DOCUMENTS

| | | |
|---|---|---|
| 5,093,918 A | 3/1992 | Heyen |
| 5,159,673 A | 10/1992 | Sackmann |
| 5,204,961 A | 4/1993 | Barlow |
| 5,245,532 A | 9/1993 | Mourier |
| 5,283,856 A | 2/1994 | Gross |
| 5,319,776 A | 6/1994 | Hile |
| 5,333,266 A | 7/1994 | Boaz |
| 5,377,354 A | 12/1994 | Scannell |
| 5,423,042 A | 6/1995 | Jalili |
| 5,448,734 A | 9/1995 | Hrabik |
| 5,471,519 A | 11/1995 | Howe |
| 5,473,671 A | 12/1995 | Partridge, III |
| 5,539,828 A | 7/1996 | Davis |
| 5,548,789 A | 8/1996 | Nakanura |
| 5,600,799 A | 2/1997 | Young |
| 5,604,803 A | 2/1997 | Aziz |
| 5,608,786 A | 3/1997 | Gordon |
| 5,619,648 A | 4/1997 | Canale |
| 5,627,764 A | 5/1997 | Schutzman |
| 5,630,123 A | 5/1997 | Hogge |
| 5,632,018 A | 5/1997 | Otorii |
| 5,655,079 A | 8/1997 | Hirasawa |
| 5,721,779 A | 2/1998 | Funk |
| 5,734,903 A | 3/1998 | Saulpaugh |
| 5,742,668 A | 4/1998 | Pepe |
| 5,742,769 A | 4/1998 | Lee |
| 5,768,519 A | 6/1998 | Swift |
| 5,781,857 A | 7/1998 | Hwang |
| 5,796,840 A | 8/1998 | Davis |
| 5,826,022 A | 10/1998 | Nielsen |
| 5,832,227 A | 11/1998 | Anderson |
| 5,835,722 A | 11/1998 | Bradshaw |
| 5,859,967 A | 1/1999 | Kaufeld |
| 5,884,033 A | 3/1999 | Duvall |
| 5,893,911 A | 4/1999 | Piskiel |
| 5,909,589 A | 6/1999 | Parker |
| 5,917,489 A | 6/1999 | Thurlow |
| 5,930,479 A | 7/1999 | Hall |
| 5,937,162 A | 8/1999 | Funk |
| 5,999,600 A | 12/1999 | Shin |
| 5,999,932 A | 12/1999 | Paul |
| 5,999,967 A | 12/1999 | Sundsted |
| 6,014,634 A | 1/2000 | Scroggie |
| 6,023,723 A | 2/2000 | McCormick |
| 6,052,709 A | 4/2000 | Paul |
| 6,055,510 A | 4/2000 | Henrick |
| 6,057,841 A | 5/2000 | Thurlow |
| 6,073,142 A | 6/2000 | Geiger |
| 6,092,101 A | 7/2000 | Birrell |
| 6,112,227 A | 8/2000 | Heiner |
| 6,154,765 A | 11/2000 | Hart |
| 6,173,322 B1 | 1/2001 | Hu |
| 6,182,118 B1 | 1/2001 | Finney et al. |
| 6,189,026 B1 | 2/2001 | Birrell |
| 6,195,698 B1 | 2/2001 | Lillibridge |
| 6,199,102 B1 | 3/2001 | Cobb |
| 6,199,106 B1 | 3/2001 | Shaw |
| 6,205,432 B1 | 3/2001 | Gabbard |
| 6,226,372 B1 | 5/2001 | Beebe |
| 6,230,188 B1 | 5/2001 | Marcus |
| 6,237,027 B1 | 5/2001 | Namekawa |
| 6,249,807 B1 | 6/2001 | Shaw |
| 6,266,692 B1 | 7/2001 | Greenstein |
| 6,282,565 B1 | 8/2001 | Shaw |
| 6,349,328 B1 | 2/2002 | Haneda |
| 6,356,935 B1 | 3/2002 | Gibbs |
| 6,366,950 B1 | 4/2002 | Scheussler |
| 6,373,950 B1 | 4/2002 | Rowney |
| 6,393,465 B2 | 5/2002 | Leeds |
| 6,421,709 B1 | 7/2002 | McCormick |
| 6,457,044 B1 | 9/2002 | IwaZaki |
| 6,460,074 B1 | 10/2002 | Fishkin |
| 6,484,197 B1 | 11/2002 | Donohue |
| 6,546,416 B1 | 4/2003 | Kirsch |
| 6,587,550 B2 | 7/2003 | Council |
| 6,625,257 B1 | 9/2003 | Asaoka |
| 6,640,301 B1 | 10/2003 | Ng |
| 6,671,718 B1 | 12/2003 | Meister |
| 6,678,704 B1 | 1/2004 | Bridge, Jr. |
| 6,691,156 B1 | 2/2004 | Drummond |
| 6,708,205 B2 | 3/2004 | Sheldon |
| 6,748,422 B2 | 6/2004 | Morin |
| 6,856,963 B1 | 2/2005 | Hurwitz |
| 6,868,498 B1 | 3/2005 | Katsikas |
| 6,880,088 B1 | 4/2005 | Gazier |
| 6,883,095 B1 | 4/2005 | Sandhu |
| 6,910,034 B2 | 6/2005 | Sasaki et al. |
| 6,957,770 B1 | 10/2005 | Robinson |
| 7,039,949 B2 | 5/2006 | Cartmell et al. |
| 7,043,753 B2 | 5/2006 | Roddy |
| 7,065,341 B2 | 6/2006 | Kamiyama |
| 7,076,533 B1 | 7/2006 | Knox |
| 7,085,925 B2 | 8/2006 | Hanna |
| 7,120,927 B1 | 10/2006 | Beyda |
| 7,136,897 B1 | 11/2006 | Raghunandan |
| 7,181,764 B2 | 2/2007 | Zhu |
| 7,185,194 B2 | 2/2007 | Morikawa |
| 7,185,359 B2 | 2/2007 | Schmidt |
| 7,188,358 B1 | 3/2007 | Hisada |
| 7,231,427 B1 | 6/2007 | Du |
| 7,263,545 B2 | 8/2007 | Digate |
| 7,287,060 B1 | 10/2007 | McCown et al. |
| 7,346,696 B2 | 3/2008 | Malik |
| 7,359,941 B2 | 4/2008 | Doan et al. |
| 7,366,761 B2 | 4/2008 | Murray et al. |
| 7,383,433 B2 | 6/2008 | Yeager |
| 7,512,788 B2 | 3/2009 | Choi |
| 7,594,272 B1 | 9/2009 | Kennedy et al. |
| 7,610,344 B2 | 10/2009 | Mehr et al. |
| 7,647,381 B2 | 1/2010 | Logue |
| 7,650,383 B2 | 1/2010 | Logue |
| 7,802,290 B1 | 9/2010 | Bansal |
| 7,835,294 B2 | 11/2010 | Shuster |
| 7,882,360 B2 | 2/2011 | Landsman |
| 7,899,867 B1 | 3/2011 | Sherstinsky et al. |
| 8,234,371 B2 | 7/2012 | Logue |
| 8,359,360 B2 | 1/2013 | Logue |
| 2002/0042815 A1 | 4/2002 | Salzfass |
| 2002/0046099 A1 | 4/2002 | Frengut |
| 2002/0046250 A1 | 4/2002 | Nassiri |
| 2002/0099781 A1 | 7/2002 | Scheussler |
| 2002/0107856 A1 | 8/2002 | Scheussler |
| 2002/0116263 A1 | 8/2002 | Gouge |
| 2002/0116641 A1 | 8/2002 | Mastrianni |
| 2002/0147726 A1 | 10/2002 | Yehia |
| 2002/0152272 A1 | 10/2002 | Yairi |
| 2002/0184507 A1 | 12/2002 | Makower et al. |
| 2002/0194308 A1 | 12/2002 | Hall |
| 2002/0199095 A1 | 12/2002 | Bandini |
| 2003/0009698 A1 | 1/2003 | Lindeman |
| 2003/0023736 A1 | 1/2003 | Abkemeier |
| 2003/0030680 A1 | 2/2003 | Cofta |
| 2003/0037103 A1 | 2/2003 | Salmi |
| 2003/0037250 A1 | 2/2003 | Walker |
| 2003/0065926 A1 | 4/2003 | Schultz |
| 2003/0081621 A1 | 5/2003 | Godfrey |
| 2003/0086543 A1 | 5/2003 | Raymond |
| 2003/0097597 A1 | 5/2003 | Lewis |
| 2003/0110400 A1 | 6/2003 | Cartmell |
| 2003/0120948 A1 | 6/2003 | Schmidt et al. |
| 2003/0163691 A1 | 8/2003 | Johnson |
| 2003/0167311 A1* | 9/2003 | Kirsch ......................... 709/206 |
| 2003/0167402 A1 | 9/2003 | Stolfo |
| 2003/0172167 A1 | 9/2003 | Judge et al. |
| 2003/0191969 A1 | 10/2003 | Katsikas |
| 2003/0196116 A1 | 10/2003 | Troutman |
| 2003/0200267 A1 | 10/2003 | Garrigues |
| 2003/0233418 A1 | 12/2003 | Goldman |
| 2003/0236847 A1 | 12/2003 | Benowitz |
| 2004/0003283 A1 | 1/2004 | Goodman |
| 2004/0015554 A1 | 1/2004 | Wilson |
| 2004/0054887 A1 | 3/2004 | Paulsen, Jr. |
| 2004/0087300 A1 | 5/2004 | Lewis |
| 2004/0111480 A1 | 6/2004 | Yue |

(56) References Cited

U.S. PATENT DOCUMENTS

| | | |
|---|---|---|
| 2004/0131187 A1 | 7/2004 | Takao et al. |
| 2004/0143633 A1 | 7/2004 | McCarty |
| 2004/0145773 A1 | 7/2004 | Oakeson et al. |
| 2004/0148358 A1 | 7/2004 | Singh |
| 2004/0167942 A1 | 8/2004 | Oshinsky et al. |
| 2004/0181581 A1 | 9/2004 | Kosco |
| 2004/0199595 A1 | 10/2004 | Banister |
| 2004/0236835 A1 | 11/2004 | Blankenship |
| 2004/0236838 A1 | 11/2004 | Tout |
| 2004/0243676 A1 | 12/2004 | Blankenship |
| 2004/0243678 A1 | 12/2004 | Smith |
| 2004/0243698 A1 | 12/2004 | Blankenship |
| 2005/0015455 A1 | 1/2005 | Liu |
| 2005/0015481 A1 | 1/2005 | Blankenship |
| 2005/0015482 A1 | 1/2005 | Blankenship |
| 2005/0044155 A1 | 2/2005 | Kaminski et al. |
| 2005/0055410 A1 | 3/2005 | Landsman et al. |
| 2005/0076220 A1 | 4/2005 | Zhang |
| 2005/0076221 A1 | 4/2005 | Olkin |
| 2005/0076222 A1 | 4/2005 | Olkin |
| 2005/0081059 A1 | 4/2005 | Bandini |
| 2005/0097319 A1 | 5/2005 | Zhu |
| 2005/0097321 A1 | 5/2005 | Zhu |
| 2005/0188045 A1 | 8/2005 | Katsikas |
| 2005/0204012 A1 | 9/2005 | Campbell |
| 2005/0250473 A1 | 11/2005 | Brown et al. |
| 2005/0276234 A1 | 12/2005 | Feng et al. |
| 2006/0021017 A1 | 1/2006 | Hinton et al. |
| 2006/0031338 A1 | 2/2006 | Kang et al. |
| 2006/0053203 A1 | 3/2006 | Mijatovic |
| 2006/0059238 A1 | 3/2006 | Slater |
| 2006/0101021 A1 | 5/2006 | Davis |
| 2006/0112165 A9 | 5/2006 | Tomkow |
| 2006/0168048 A1 | 7/2006 | Lyle |
| 2006/0212520 A1 | 9/2006 | Logue et al. |
| 2006/0218628 A1 | 9/2006 | Hinton et al. |
| 2006/0230461 A1 | 10/2006 | Hauser |
| 2006/0248573 A1 | 11/2006 | Pannu |
| 2007/0016641 A1 | 1/2007 | Broomhall |
| 2007/0130343 A1 | 6/2007 | Pardo-Blazquez et al. |
| 2008/0162926 A1 | 7/2008 | Xiong |
| 2009/0187501 A1 | 7/2009 | Winter et al. |
| 2011/0106900 A1 | 5/2011 | Landsman |
| 2013/0067004 A1 | 3/2013 | Logue et al. |
| 2013/0080552 A1 | 3/2013 | Logue et al. |
| 2013/0174225 A1 | 7/2013 | Landsman |

FOREIGN PATENT DOCUMENTS

| | | |
|---|---|---|
| EP | 651533 | 5/1995 |
| EP | 686327 | 12/1995 |
| EP | 721268 | 7/1996 |
| EP | 725523 | 8/1996 |
| EP | 760565 | 7/1998 |
| EP | 883271 | 12/1998 |
| WO | WO94/06236 | 3/1994 |
| WO | WO96/09714 | 3/1996 |
| WO | WO96/24213 | 8/1996 |
| WO | WO97/14234 | 4/1997 |
| WO | WO97/20423 | 6/1997 |
| WO | WO97/23082 | 6/1997 |
| WO | WO97/24825 | 7/1997 |
| WO | WO97/26709 | 7/1997 |
| WO | WO98/37675 | 8/1998 |
| WO | WO99/10817 | 3/1999 |
| WO | WO01/16695 | 3/2001 |
| WO | WO02/077768 | 10/2002 |
| WO | WO03/044617 | 5/2003 |

OTHER PUBLICATIONS

Damiani, Ernesto, et al. "A reputation-based approach for choosing reliable resources in peer-to-peer networks." Proceedings of the 9th ACM conference on Computer and communications security. ACM, 2002.*

Controlling E-Mail Spam [online] [retrieved on Mar. 28, 2003]. Retrieved from the Internet URL: http://spam.abuse.net/adminhelp/mail.shtml, pp. 1-5.

MailCircuit's Email Handshake Verification and Spam Filter Process [online]. Retrieved from the Internet URL: http://www.mailcircuit.com/filter.htm, p. 1-2.

To Mung or Not to Mung [online] [retrieved on Apr. 25, 2003]. Retrieved from the Internet URL: http://groups.google.com/groups?q=The+Deadbolt+tm +%2Bspam&hl=en&lr=&ie=UTF-8 . . . , pp. 1-2.

Aguilar, Rose, AOL fights to ban junk, CNETNews.com, Sep. 6, 1996, 3 pages, http://www.news.com/News/Item/0.43106,00.html.

Andrew Leonard, SpamBomers, Sep. 1997, 7 pages, Salon Magazine + about 21st + newsletter.

Bob Tiptrie, A Way to Stop Spam Messages, online, retrieved Apr. 25, 2003, 4 pages, retrieved from the internet http://groups.google.com/groups.

Cementing Online Partnerships and Improving User Experience, RSA Security, retrived online May 17, 2006, 7 pages, www.rsasecurity.com.

Chinese Abstract for CN 1117680, published Feb. 28, 1996.

CNET News.com staff, ISP: Internet Spam Provider, Feb. 18, 1997, 2 pages, CNET News.com.

Cole-Gomolski, Barb, Adoption of S/MIME still lagging, May 11, 1998, 4 pages, http://www.computerworld.com/home/features.nsf/ . . . .

Cynthia Dwork et al., Pricing via Processing or Combatting Junk Mail, Jul. 2002, 12 pages, Technical Report CS95-20, Matematics & Computer Science, Weizmann Institute of Science.

Cynthia Dwork, Fighting Spam May be Easier Than You Think, 1992, 30 pages, presentation given in Crypto.

Cynthia Dwork, Fighting Spam: The Science, 2004, pp. 3-4, M. Farach-Colton (Ed.): Latin 2004, LNCS 2976, Springer-Verlag Berlin.

D.J. Berstein, Variable Envelope Return Paths, Feb. 1, 1997, 2 pages, http://cr.yp.to/proto/verp.txt.

David A. Wheeler, Countering Spam with Ham-Authenticated Email and the Guarded Email Protocol, Draft: First version Dec. 8, 2002; Released Apr. 2, 2003, 28 pages, dwheeler@dwheeler.com.

David F. Skoll, How to make SURE a human is sending you mail (was Re: Random e-mails), Nov. 15, 2006, 2 pages, news.admin.net-abuse.usenet, http://groups.google.com/group/news.admin.net-abuse.usenet/msg/e601783e8f40c54?d . . . .

Dealing with Unsolicited Commercial Email (UCE, "email spam"), 2005 Public Access Networks Corporation, online, retrieved on Jun. 6, 2006, 3 pages, retrieved from the Internet http://www.panix.com/uce.html, Copyright 2003.

Douglas G. Henke, All Hail Emperor Lewis?, online, Feb. 20, 1997, 2 pages, retrived Apr. 25, 2003, retrived from the internet http://groups.google.com/groups.

Ed Foster, The Gripe Line Threatening legal action may be the quickeest way off a junk e-mailer's list, Info World Info Quote, Sep. 9, 1996, 2 pages, vol. 18, Issue 37, http://www.infoworld.com/egi-bin/siplayArchives.pl? . . . .

Foiling Spam with an Email Password System, online, retrieved on Jun. 28, 2004, 10 pages, retrieved from the Internet, http://www.uwasa.fi/~ts/info/spamfoil.html.

J. Klensin et al., IMAP/POP Authorize Extension for Simple Challenge/Response, Sep. 1997, 5 pages.

Jameson, Bob, Filter for mail not addressed to you, Jesse Berst's Anchor Desk, Sep. 6, 1996, 3 pages, http://www.news.com/News/Item/0.43106,00.html.

Janet Kornblum, Programmer Writes Spam Bomb, Aug. 6, 1997, 2 pages, CNET News.com.

Julian Byrne, My Spamblock; Was: Thwarting UCE Address Culling Programs, online, Jan. 19, 1997, 2 pages, retrieved Apr. 28, 2003, retrieved from the internet http://google.com/groups.

Julian Byrne, New Improved EZSPAM! Was: My Spamblock . . . , online, Jan. 28, 1997, 4 pages, retrieved Apr. 25, 2003, retrived from the internet, http://groups.google.com/groups.

Lorrie Faith Crano et al, Spam!, Aug. 1998, pp. 74-83, Communications of the ACM, vol. 41, No. 8.

(56) References Cited

OTHER PUBLICATIONS

Michael's Stop Junk E-Mail, Stop Junk E-mail, Nov. 17, 1996, 2 pages, http:/www.crl.com/-michaelp/stopjunkmail.html.
Mihir Bellare et al., Does Paralllel Repition Lower the Error in Computationally Sound Protocols?, 1997, 24 pages, Proceedings of the 38th Symposium on Foundations of Computer Science, IEEE.
MIT LCS, Applied Security Reading Group, by Email Sit and Kevin Fu, 2 pages, updated May 5, 2003 on the Internet http://www.pdocs.lcs.mit.edu/asrg/.
NAGS Spam Filter, 11 pages, http://www.nags.org/spamfilter.html.
Noni Naor, Verification of a Human in the Loop or Identification via the Turing Test, Sep. 1996, Cited in All On-Line Papers.
P. Resnick, RFC28822, Apr. 2001, 51 pages, Qualcom Incorporated, http:rfc.net/rfc2822.html.
Paul Hoffman et al., Unsolicited Bulk Email: Mechanisms for Control, Internet Mail Consortium Report UBE-SOL, IMCR-2008, revised May 4, 1998,16 pages.
Paul Hoffman et al., Unsolicited Bulk Email: Mechanisms for Control, Internet Mail Consortium Report UBE-SOL, IMCR-005, Oct. 13, 1997, 31 pages.
Public Access Networks Corporation, Responding to Unsolicited Commercial Email (UCE, "email spam"), Feb. 25, 1997, 5 pages, http:www.panix.com/uce.html.
Showing Full Headers of a Message, Nov. 6, 1998, 3 pages, http://www.panix.com/headers.html.
The Penny Black Project, online, retrieved on May 8, 2006, 2 pages, retrieved from the Internet http://research.microsoft.com/research/sv/PennyBlack/.
Tim Richardson, Simple Notes on Internet Security and Email, Jun. 28, 1999, 2 pages, http:/www.timrichardson.net/security.html.
Qualcomm Inc. "Eudora MailPro Version 3.0 for Windows User Manual", Jun. 1997, 198 pages.
Simpson, W. "Request for Comments (RFC) 1994: PPP Challenge Handshake Authentication Protocol (CHAP)", published by Network Working Group, Aug. 1996, 14 pages.
U.S. Appl. No. 11/017,461, Aug. 26, 2008, Office Action.
U.S. Appl. No. 11/017,461, Feb. 13, 2009, Office Action.
U.S. Appl. No. 11/017,461, Aug. 4, 2009, Office Action.
U.S. Appl. No. 11/017,461, Mar. 17, 2010, Office Action.
U.S. Appl. No. 11/017,461, Sep. 16, 2010, Notice of Allowance.
U.S. Appl. No. 12/987,609, Mar. 29, 2011, Office Action.
U.S. Appl. No. 12/987,609, Sep. 14, 2011, Office Action.
U.S. Appl. No. 12/987,609, Mar. 13, 2012, Office Action.
U.S. Appl. No. 12/987,609, Aug. 3, 2012, Notice of Allowance.
U.S. Appl. No. 13/620,647, Aug. 23, 2013, Office Action.
U.S. Appl. No. 10/747,557, filed Dec. 29, 2003, Sullivan et al.
U.S. Appl. No. 11/017,461, filed Dec. 20, 2004, Landsman.
U.S. Appl. No. 11/080,240, filed Mar. 15, 2005, Logue et al.
U.S. Appl. No. 13/550,913, filed Jul. 17, 2012, Logue et al.
Federated Identity: Cementing Online Partnerships and Improving User Experience, 2004 RSA Security, Inc. [online] [retrieved on May 17, 2006]. Retrieved from the Internet: http://web.archive.org/web/20040526095021/http://www.rsasecurity.com/node.asp?id=1191 (7 pages).
International Search Report Issued in PCT/US06/12189, dated Jul. 17, 2007.
U.S. Appl. No. 11/080,240, Jan. 2, 2009, Office Action.
U.S. Appl. No. 11/080,240, May 26, 2009, Notice of Allowance.
U.S. Appl. No. 11/080,240, Aug. 21, 2009, Notice of Allowance.
U.S. Appl. No. 11/098,333, Jun. 19, 2009, Office Action.
U.S. Appl. No. 11/098,333, Aug. 28, 2009, Notice of Allowance.
U.S. Appl. No. 12/633,374, Dec. 14, 2010, Office Action.
U.S. Appl. No. 12/633,374, Dec. 19, 2011, Office Action.
U.S. Appl. No. 12/633,374, Apr. 3, 2012, Notice of Allowance.
U.S. Appl. No. 13/620,674, Mar. 26, 2013, Office Action.
U.S. Appl. No. 13/620,674, Jan. 13, 2014, Notice of Allowance.
U.S. Appl. No. 12/633,290, Oct. 25, 2011, Office Action.
U.S. Appl. No. 12/633,290, Apr. 24, 2012, Office Action.
U.S. Appl. No. 12/633,290, Oct. 9, 2012, Notice of Allowance.
U.S. Appl. No. 13/620,647, Feb. 11, 2014, Office Action.
U.S. Appl. No. 13/620,926, Feb. 1, 2013, Office Action.

\* cited by examiner

MESSAGING SYSTEMS AND METHODS

CROSS-REFERENCE TO RELATED APPLICATIONS

This application is a continuation of U.S. patent application Ser. No. 12/987,609, filed Jan. 10, 2011, which is a continuation of U.S. patent application Ser. No. 11/017,461, filed Dec. 20, 2004 and issued Feb. 1, 2011 as U.S. Pat. No. 7,882,360, which claims the benefit of priority to U.S. Provisional Patent Application No. 60/531,536, filed on Dec. 19, 2003. The entire contents of these applications are incorporated herein by reference.

BACKGROUND

1. The Field of the Invention

The present invention relates to systems, methods, and computer program products for implementing electronic messaging lists. In particular, the invention relates to systems, methods, and computer program products for implementing group messaging lists based on trust mechanisms.

2. Background and Relevant Art

Electronic messages such as email and instant message systems have become a convenient method of communication for a growing number of people and businesses. One problem with such systems, however, is that it is now fairly common to receive unsolicited messages, particularly from unknown persons or entities. Accordingly, a number of filtering systems have been developed to avoid inefficiencies associated with having to read and/or summarily delete vast sums of messages from unknown recipients, or from suspect content providers.

For example, content-based filtering systems may filter out messages based on content typically found in advertisements, content that is offensive in one or more ways, or the like. Unfortunately, these types of filters may also accidentally filter out messages from trusted friends or family based on an errant analysis of the email content.

A "white list"-based filtering system, on the other hand, typically filters out messages based on an advanced trust of the sending entity's messaging address. This advanced trust can be created when the user of the white list sends a message to trusted people or entities, or when the user manually enters one or more trusted messaging addresses in the white list. Those whom the user trusts can then correspond with the user of the white list without additional challenges. Unfortunately, white-list filters typically do not filter out messages between the user of the white list and trusted members of the list based on categories of information, or secondary characteristics of the list members (e.g., family, friend, etc.). Furthermore, white lists do not typically let trusted members of the list identify each other, and therefore send and receive messages to each other.

Another type of filtering system is group-based messaging (also referred to as a "group list" or "message group list"), which is similar in some respects to white lists, and filter messages based on one or more addresses, as well as an additional group or category. For example, as shown in FIG. 1A, a user 105 may create a group list that includes certain members in a "family" group list 110, and includes other members in a "friends" 120, or other organization group list, such as a "research" group 130. As shown in FIG. 1B, when the user 105 sends a message 180 to a group 110 address, each group member (e.g., 140, 150, 160, 170) of group 110 receives the message 180 without additional challenges. In addition, each group member (e.g., 140, 150, 160, 170) in the group may also identify the other group members, and so may also correspond with other group members without challenge.

One advantage of group message lists is that send and receive authority within the group depends primarily on group membership, thus prohibiting non-members from having the same interaction with the group. Thus, for example, all members of an "accounting" group may be automatically enabled to send and receive accounting group messages, but not send or receive "research" group messages. Unfortunately, persons who may be appropriate for viewing or sending certain group messages, but are otherwise persons not designated as group members, cannot view, send, or receive messages intended for the group without some difficulty.

For example, within an organization, a research employee may ask the group creator to add the research employee to an accounting membership list. The group administrator, however, may be reticent in adding the research employee to the accounting message group, since it may be inappropriate to give the research employee all the relevant send and receive privileges inherent to other group members of that group. As such, a client that is a non-member of the group may rely on asking a trusted member of a given group list to forward certain group-specific messages to the client. One can appreciate that it would be fairly inefficient for the client to rely on the group member's time and effort to forward the requested messages directed to one group, much less several groups.

Accordingly, an advantage in the art can be realized with systems, methods, and computer program products that implement trust-based mechanisms between groups, group members, and group non-members. In particular, it would be an advantage in the art to be able to combine the benefits of a white list with the benefits of a group messaging system, and thereby improve the efficiency of distributing messages in a trusted fashion.

SUMMARY

The present invention solves one or more of the foregoing problems in the art with systems, methods, and computer program products for sending or receiving group messages between group members and subscribers through trust-based systems. In particular, a group subscriber can receive messages directed to a specific group by indicating a level of trust with a member of the group. The subscriber can also send messages to the corresponding group members that have indicated a level of trust with that subscriber.

For example, in one implementation of the present invention, a group member can create, or simply belong to, one or more group message lists that include a corresponding electronic address for each of one or more groups and/or group members. Each of the group members of each group have a similar level of trust within the group, such that each of the group members can identify, send and/or or receive messages to or from the group, or to or from other group members within the group without challenge.

A non-member of any given group can subscribe to one or more of the given groups by indicating a level of trust with the group member. If the trust request is accepted, the non-member becomes a subscriber to the requested group. After creating a trust relationship with the group or group member, the subscriber can then receive messages directed to the group generally, or from any group member sending a specific message directly to the subscriber. By contrast, messages the subscriber sends to the group or any group members are subject to a trust challenge.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to systems, methods, and computer program products for sending or receiving group messages between group members and subscribers through trust-based systems. In particular, a group subscriber can receive messages directed to a specific group by indicating a level of trust with a member of the group. The subscriber can also send messages to the corresponding group members that have indicated a level of trust with that subscriber.

As a preliminary matter, a "subscriber" will be understood to mean any third-party, such as a group non-member, an electronic alias that refers to the group non-member, an organization, or any other type of entity that is not initially included in a group list membership, but later (or presently) can communicate with the group list based on a created trust relationship. A "group list," "message group list," or "group" as already herein described, will be understood to mean an electronic message list that includes one or more electronic addresses organized under a common theme. A "group member" will be understood to mean any member of a group list, such as a group creator, group administrator, or ordinary group member included in the group list.

Figure 1A:
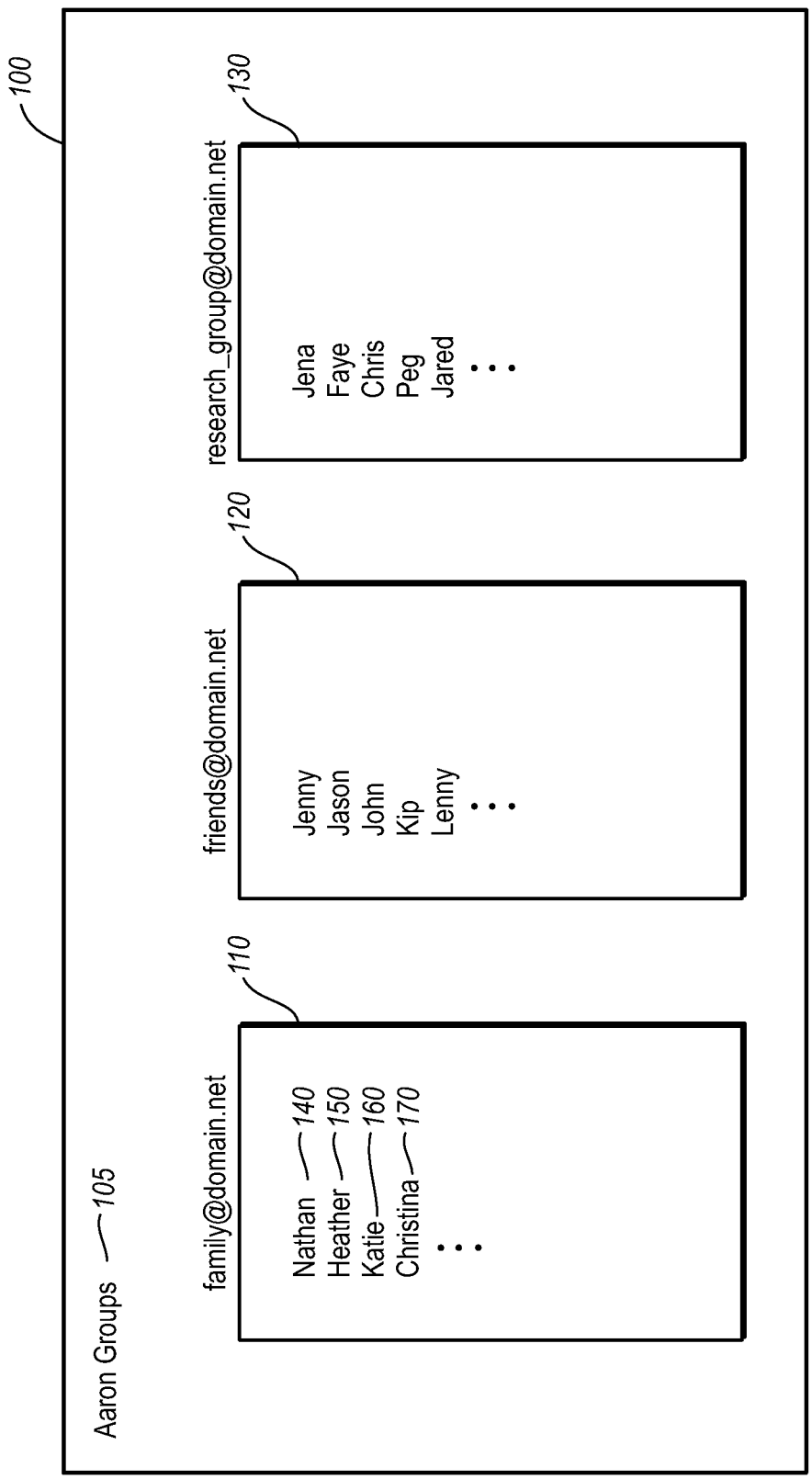
FIG. 1A illustrates a prior art block diagram of a group member that is a member of multiple group lists.
Figure 1B:
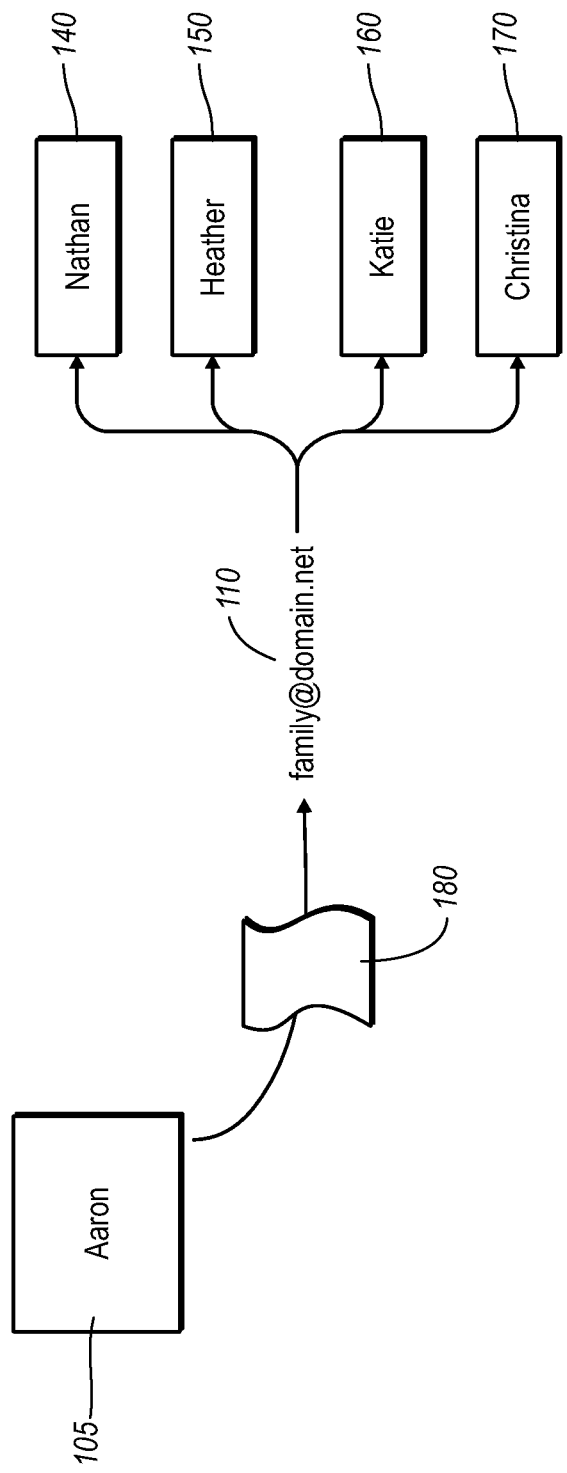
FIG. 1B illustrates a prior art block diagram for sending and receiving messages between a group member and other group members of one of the group lists illustrated in FIG. 1A.
Figure 2A:
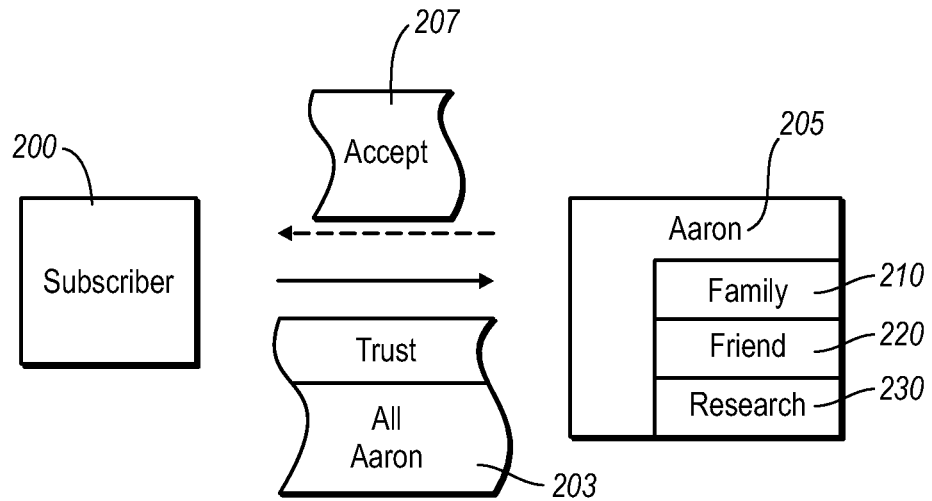
FIG. 2A illustrates a block diagram in accordance with an implementation of the present invention in which a subscriber and a group member generate a trust relationship between the subscriber and all groups associated with the group member.
Figure 2B:
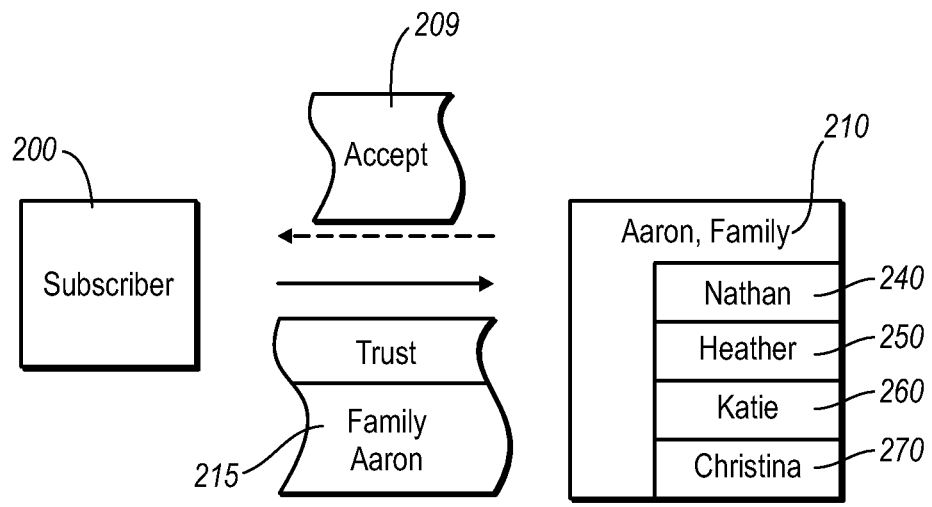
FIG. 2B illustrates a block diagram in accordance with an implementation of the present invention in which a subscriber and a group member generate a trust relationship between the subscriber and only some groups associated with the group member.

FIGS. 2A through 2B are block diagrams that illustrate an implementation in which a subscriber generates a trust relationship with one or more group lists, in order to receive one or more group messages. For example, group member Aaron 205 (or, e.g., group members 240, 250, 260, or 270) may forward a group list message to subscriber 200. The subscriber 200 might decide that, based on the subscriber's 200 knowledge of group member Aaron 205 (or relevant group member), and/or based on the content of the message 180, the subscriber 200 "trusts" messages sent by group member Aaron 205, or would like to read messages sent to groups to which member Aaron 205 belongs.

Accordingly, FIG. 2A shows that the subscriber 200 sends a trust indicator 203 to group member Aaron 205. For the purposes of this specification and claims, a "trust indicator" 203 can be a separate electronic message sent from the subscriber to a group member 205 that indicates the subscriber's 200 identity, and/or a request to send and/or receive electronic communication with the group member's 205 associated group lists (e.g., 210, 220, 230). The trust indicator 203 can include a digital identification certificate, such as a digital signature, or any other type of electronic identifier, such as a security token and key system. In other implementations, the trust indicator message 203 includes information such as the subscriber's physical or virtual network addresses, one or more electronic message addresses, and so forth.

When the group member 205 receives the trust indicator 203 from the subscriber 200, the group member 205 can grant or deny the trust indicator 203 in a variety of different ways. In one implementation, for example, the group member 205 responds to the subscriber 200 with a trust indicator acceptance message 207. A trust indicator acceptance message 207 is an electronic message that can include various identification and/or security certificates, similar to those described above for the trust indicator 203. The trust indicator acceptance message 207 can also include other types of information, such as a group name electronic message address, network routing information, level of reciprocal trust from the group member 205 to the subscriber 200, and so forth.

In another implementation, the group member 205 responds to the subscriber 200 by automatically sending a challenge to the subscriber 200. For example, response message 207 can include text that requires the subscriber to read the automatic response, type data contained within the automatic response, and send a new confirmation message that includes the typed data. If the subscriber's response (not shown) is appropriate, the group member 205 grants the subscriber 200 access to the group list by creating a trust relationship. In another implementation, a challenge and response mechanism is based primarily on the subscriber's network address. If the subscriber's network address is valid and trusted, a trust relationship is created. Accordingly, there is a wide variety of authentication and challenge/response mechanisms that can be implemented in accordance with the present invention.

Once the trust relationship is created, the subscriber 200 is, in effect, added to the trusted group list for outgoing messages on an unlimited basis, and allowed to send messages to the group on a limited basis, based on one or more group or group member settings. For example, the trust relationship can generate a corresponding relay mechanism, such as an address forwarding file in the group list that includes the subscriber's electronic address, or one or more electronic addresses for other trusted subscribers. As previously indicated, however, the relay mechanism allows the subscriber 200 to receive messages from each group without challenge, but to primarily send messages to each group, or to each corresponding group member, subject to additional challenges. For example, the subscriber 200 may send a message to group Family 210, but if none of the group members of Family 210, except for group member Aaron 205, have created a trust relationship with the subscriber 200, only group member Aaron 205 would be able to view the subscriber's message.

As shown in FIG. 2B, the subscriber 200 and group member Aaron 205 can also create a more limited trust relationship, such that the subscriber 200 has a trust relationship for less than all of the group lists associated with group member Aaron 205. This can be by choice of the subscriber 200 or the relevant group member, or the relevant group member may have settings configured to allow outside access only to certain groups (e.g., group 220, but not group 230). This limited group trust can also be based on communication made between the subscriber 200 and relevant group member during a challenge and response sequence as previously described, such that a certain subscriber response merits access to group 210, and a certain other subscriber response merits access to group 210 and 220.

For example, as shown in FIG. 2B, subscriber 200 sends a limited trust request 215 to group member Aaron 205 so that subscriber 200 can communicate only with "Family" group 210. In turn, group member Aaron 205 can grant the trust indicator 215, by sending a trust indicator acceptance message 209 that is similar to trust indicator acceptance message 207. The trust indicator acceptance message 209 can be of the same form as already described herein, and can include detailed configuration data for how the subscriber 200 can interact with the entire Family group 210, and/or various members of the group 210 (e.g., 240, 250, 260, 270). Accordingly, group member Aaron 205 creates a trust relationship with subscriber 200, which allows subscriber 200 to communicate with family group 210 within varying limits of trust.

One will appreciate that these varying limits of trust can be configured for a wide range of options that are appropriate for different circumstances from group to group, or from group member to group member. For example, it may be that a potential subscriber would like to view certain messages from a research group (e.g., group 230), but not all messages directed to the research group. In particular, the subscriber may wish to review research group messages that pertain particularly to scheduling issues. On the other hand, the group list members or group list administrator may desire to keep most research group messages internal to the group members, particularly those concerning sensitive technologies. Accordingly, the group list administrator may allow group members only to allow a trust relationship for messages that conform to certain content regulations, such as those specifically labeled as "scheduling." Similarly, a group member may desire to designate which outgoing group messages can be sent to trusted subscribers, and which must remain internal only.

In another example, a group member (e.g., 240) can configure "receive" permissions differently for different groups when joining the groups, or at some later point in time as a group member. For example, group member 240 may configure receive settings for group 210 so that group member 240 accepts all group member (e.g., 205, 250, 260, 270) messages (e.g., FIG. 3A, message 225) as well as group subscriber 200 messages (e.g., FIG. 3C, message 245) to group 210 without challenge. Similarly, group member 240 may configure the receive settings of group 220 so that group member 240 accepts all group member messages without challenge, but challenges any subscriber 200 messages (e.g., FIG. 3C, message 245) to group 220. The group member may still trust certain types of subscribers and not others, such that the group member accepts messages from certain sub-classes of subscribers to group 220, and challenges messages sent by other sub-classes of subscribers.

In another example, a given group may be configured with default subscriber receive privileges that are inherent in group list membership. One such default setting can provide that all group members of the group list receive group messages from group members to the group, and also receive any group messages sent by any subscribers to the group without challenge. For example, a given agent may have established a trust relationship with an employee of company C. If the group list for company C is configured such that all group list C members of company C are to receive subscriber messages, all employees (i.e., group members) of company C will receive group mail sent by the agent (the subscriber) to company C without challenge, even though the agent is only a subscriber of the company C mail list.

Similarly, a given group may be configured with different subscriber accept privileges when the subscriber subscribes to the group list. One such default setting can provide that group messages from one class of subscribers of the group list (those having send and receive rights) send group messages to, and receive group messages from, another class of subscribers (having receive rights only) to the group list, and also receive any group messages sent by other group members to the group without challenge. For example, a given agent may have established a trust relationship with an employee of company C that grants send and receive privileges to the group without challenge. Another employee of company C may have also granted a receive-only trust relationship with another third-party subscriber. Accordingly, the agent subscriber can send group messages to the group list that are received by the group members of the group without challenge, and also by the third-party subscriber without challenge. By contrast, group messages sent to the group list by the third-party subscriber can be subject to challenge by each of the non-trusted group members, and also subject to challenge by the agent subscriber.

In still another example, one group list can also establish a reciprocal trust relationship with another group list. For example, two independent companies may be involved in a partnership on one project, or may be involved in a corporate merger of some sort. Rather than necessarily creating a new group list for the project, or for the new company, the respective group lists may create a trust relationship with each other, such that group list A of company A is now subscribed to group list B of company B, subject to any variable send and receive settings.

In one possible setting of a group-to-group trust relationship, all group members of group list A can send messages to, and receive messages from, any group member of group list B. In another possible setting, the group lists A and B have generic, reciprocal send and receive privileges between group members of lists A and B, while group members of group list A only receive messages from subscribers (or sub-classes of subscribers) to group list B subject to challenge, and vice versa. As such, there are a myriad of ways in which a trust relationship can be implemented between a subscriber and a group member, a subscriber and a group list, from one group list to the members of the next group list, or from one group list to the subscribers of the next group list, and so forth.

Figure 3A:
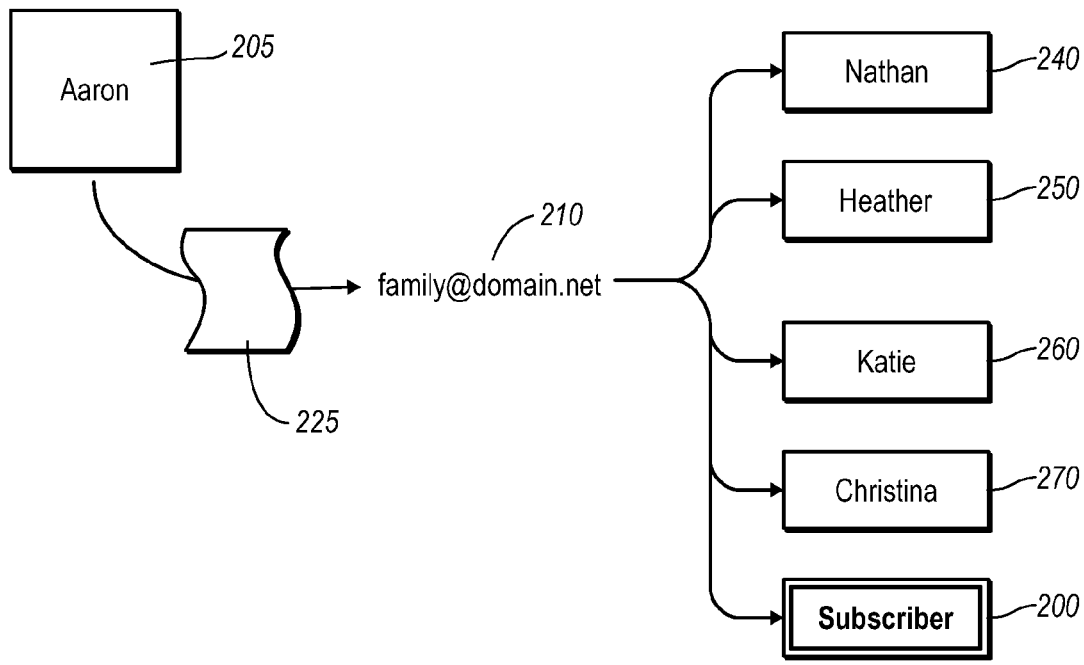
FIGS. 3A and 3B illustrate block diagrams in accordance with an implementation of the present invention in which a subscriber is able to receive different group messages from different group members.
Figure 3B:
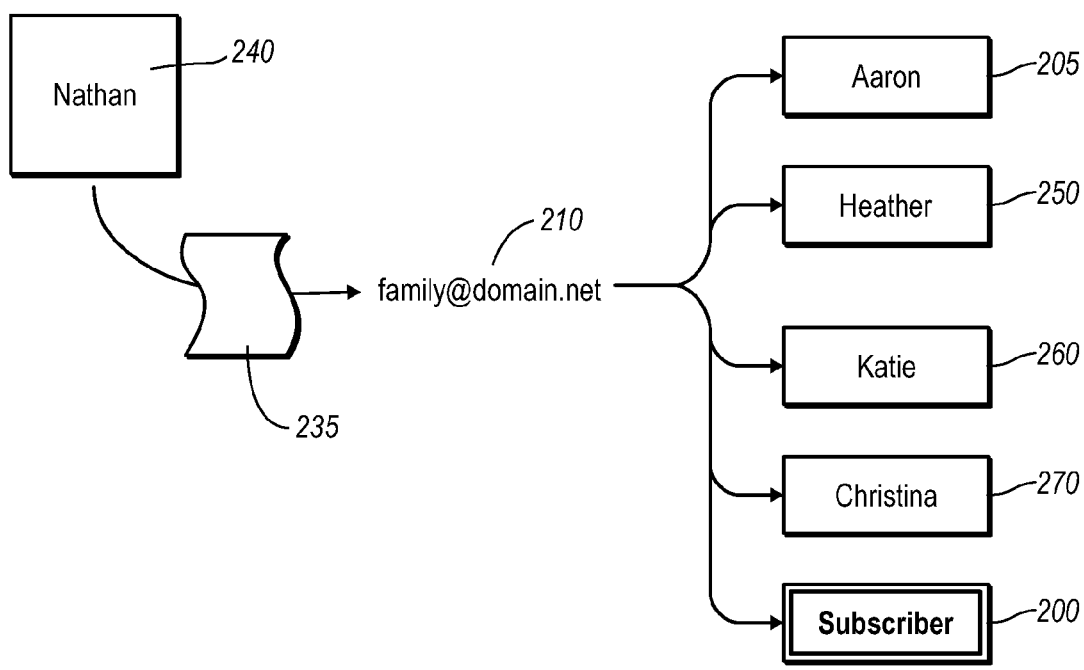
Figure 3C:
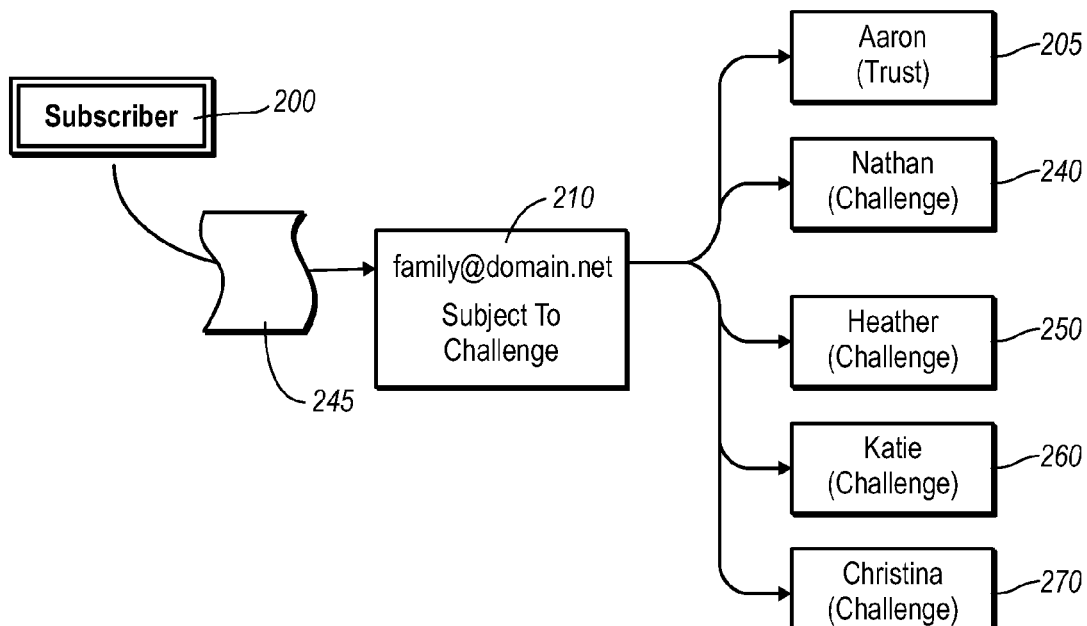
FIG. 3C illustrates a block diagram in accordance with an implementation of the present invention in which the subscriber sends a group message to a trusted group list, subject to one or more challenges.

In any event, and notwithstanding the preceding examples, FIGS. 3A through 3C illustrate block diagrams for the simplest case of sending and receiving messages 225, 235, 245, in which the subscriber 200 and only group member 205 of group 210 have created a generic trust relationship. As shown in FIG. 3A, for example, group member Aaron 205, who may be the group 210 creator, sends a message 225 to the group 210 via the address "family@domain.net." When the message 225 is sent, each of the group members such as Nathan 240, Heather 250, Katie 260, and Christina 270 can be sent a copy of the message. In addition, because a trust relationship exists (e.g., through trust indicator 203, or 215) between the subscriber 200 and group member Aaron 205, subscriber 200 also can be sent a copy of the message 235.

As shown in FIG. 3B, group member Nathan 240, who is a member of Family group 210, can send a group message 235 to group 210 via the address "family@domain.net", such that each of the recipients, including the subscriber 200 receive the message 235. In particular, the creation of a trust relationship between group member Aaron 205 and subscriber 200 effectively adds a trust relationship to each of the corresponding group members of group 210, subject to any other limits described herein. Thus, when group member Nathan 240 sends a group message 235 to group 210, group member Aaron 205, group members Heather 250, Katie 260, Christina 270, and subscriber 200 can each receive a copy of the message 225.

When the subscriber 200 sends a message to the group 210, however, a slightly different mechanism can occur. In particular, since only group member Aaron 205 has implemented a trust relationship with the subscriber 200, when the subscriber 200 sends the message 245 to group 210, only group member Aaron 205 receives the message 245 without challenge. In another implementation, the message 245 is also sent to each of group members Nathan 240, Heather 250, Katie 260, and Christina 270, such that each person can subject the message 245 to challenge. In still another implementation, a protocol at the group list domain server for "family@domain.net" subjects the message 245 to challenge based on known instances of created trust relationships, before (or in lieu of) sending the message 245 to each group member.

Figure 4:
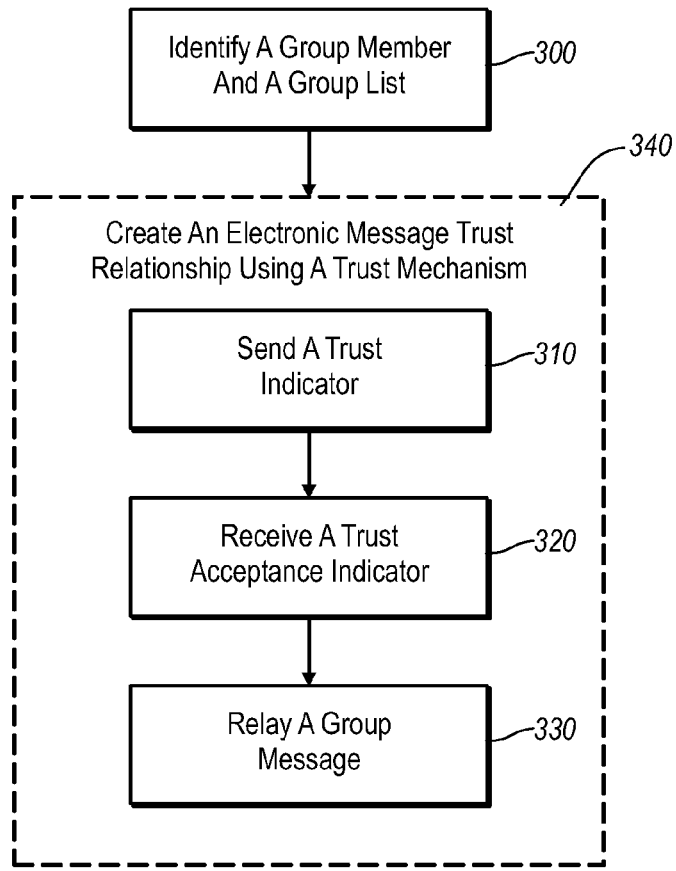
FIG. 4 illustrates a method for performing a method of establishing a trust relationship between a subscriber and a group member, in accordance with an implementation of the present invention.
Figure 5:
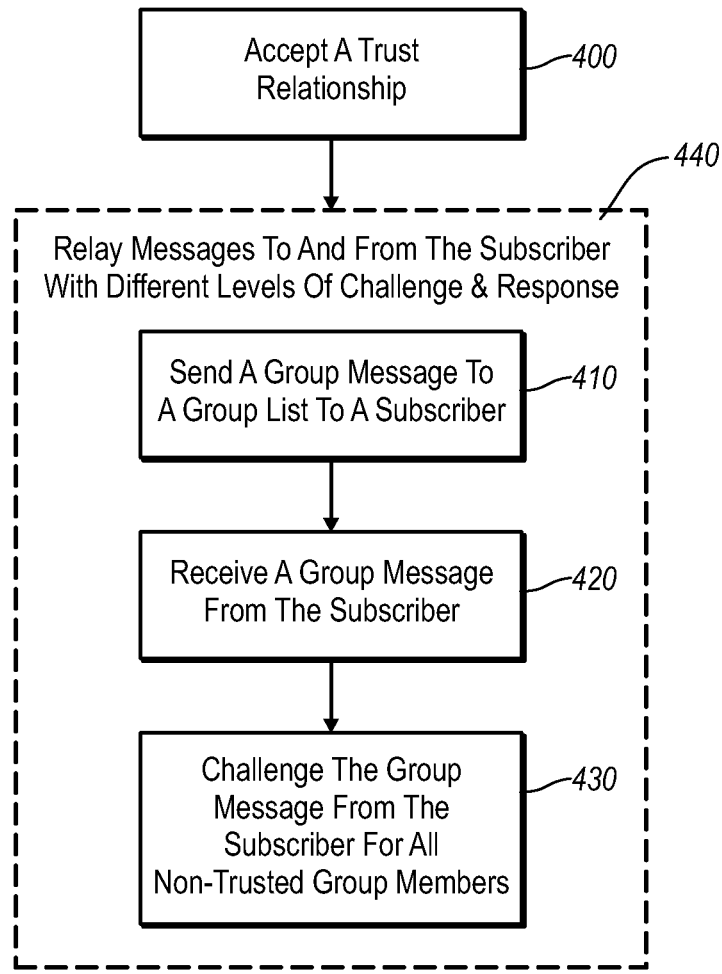
FIG. 5 illustrates a method for relaying messages between a group member or a group list and a subscriber, in accordance with an implementation of the present invention.

The present invention may also be described in terms of methods comprising functional steps and/or non-functional acts. FIGS. 4 and 5 illustrate an exemplary flow chart for creating and/or relaying group messages using trust mechanisms. The methods of FIGS. 4 and 5 will be discussed with respect to the diagrams illustrated in the preceding Figures.

For example, FIG. 4 illustrates an implementation of the present invention for communicating a group message between a subscriber and one or more group members in the one or more group lists without the subscriber having to separately join the one or more group lists. In particular, FIG. 4 shows that the method comprises an act 300 of identifying a group member and a group list. Act 300 includes identifying a group member and one or more group lists associated with the group member. For example, subscriber 200 can receive a message that has been forwarded to the subscriber 200 by a group member (e.g., group member 205). Alternatively, the subscriber 200 can have prior knowledge of the relevant group member, and desire to communicate with the group member through an associated, identifiable group, such as group 210, 220, 230.

FIG. 4 illustrates that the method further comprises a functional, result-oriented step 340 for creating an electronic message trust relationship using a trust mechanism. Step 340 comprises any corresponding acts for creating an electronic message trust relationship between a subscriber and the identified group member using a trust mechanism, whereby the trust relationship allows the subscriber to communicate with the identified group member and one or more other group members in the identified one or more group lists without requiring the subscriber to join the identified one or more group lists. As illustrated, however, step 340 comprises act 310 of sending a trust indicator. Act 310 includes sending a trust indicator by a subscriber to the identified group member. For example, subscriber 200 can send an electronic trust indicator message 203, 215 that includes identification, routing information, security information, and any necessary challenge/response information to a group creator, such as group member 205.

FIG. 4 also illustrates that step 340 comprises an act 320 of receiving a trust acceptance indicator. Act 320 includes receiving a trust acceptance indicator that indicates that the group member has accepted the trust indicator, wherein the subscriber can receive messages directed to at least one of the identified one or more group lists. For example, if the group member (e.g., group member 205) agrees to the requested trust relationship, the relevant granting entity can send an electronic response message 207, 209 to the subscriber 200 that acknowledges the trust indicator request 203, 215, and provides the relevant instructions for communicating through the trust relationship. These instructions can include any electronic message addresses, any routing information, any group membership information, and any other trust acceptance information as appropriate.

FIG. 4 also illustrates that step 340 comprises an act 330 of relaying a group message. Act 330 includes relaying a group message between one or more group members in the at least one of the identified one or more group lists and the subscriber. For example, the trusted group member 205 can send a message 225 to the group 210, such that the message 225 is sent to each original group member of a group 210, and also to subscriber 200 based on the trusted relationship. Similarly, a non-trusted group member 240 can send a group message (or personal message) to group member 205, which is also copied to subscriber 200 based on the trusted relationship. By contrast, the subscriber 200 can also send a group message 245 to the group list 210, subject to a receive setting by the group 210 or group members (e.g., 205, 240, 250, etc.). For example, if a non-trusted group member has a receive setting that challenges any messages by a subscriber, the group message sent by the subscriber 200 can be accepted by the trusted group member 205, but subject to challenge by other non-trusted group members (e.g., group member 240).

FIG. 5 illustrates another method in accordance with the present invention, albeit primarily from the group list or group member perspective. In particular, FIG. 5 illustrates a method for relaying messages between group members and a subscriber based on one or more trust relationships. For example, the method shown in FIG. 5 comprises an act 400 of accepting a trust relationship. Act 400 includes an act of a group member 205 accepting a trust relationship with a subscriber 200, such that the subscriber 200 is capable of receiving group messages sent to a group (e.g., group 210, 220, 230, etc.) to which the group member belongs. For example, in response to a trust relationship request (e.g., 203, 215) sent from a group non-member, the group member, or group list administrator, accepts the request for the trusted relationship by sending a corresponding trust acceptance (e.g., 207, 209).

The method shown in FIG. 5 also comprises a step 440 for relaying messages to and from the subscriber with different levels of challenge and response. In particular, step 440 includes relaying messages to and from the subscriber with different levels of challenge and response, such that the subscriber can receive messages without challenge that are directed to the group list, and such that group members that have not trusted the subscriber subject messages to the group sent by the subscriber to a receive setting. For example, a trust mechanism set up with the group list (e.g., 210, 220, 230) enables the subscriber 200 to receive all group messages (e.g., 225, 235) sent from any group members to the group list. Furthermore, a receive setting that involves a challenge mechanism at the group list domain server, or at the computer systems for each group member, subjects the subscriber's group message to challenge where no trust relationship exists for a given group member.

Although step 440 can comprise any number or order of corresponding acts, FIG. 5 shows that the step 440 comprises an act 410 of sending a group message to a group list to a subscriber. Act 410 includes sending a group message by a group member to a group list to a subscriber, such that a trusted subscriber receives any messages sent to the group list, or sent directly to the subscriber by an individual group member. For example, if a group member 240 sends a message 235 to the group list 210, the group domain server sends a duplicate of the message 235 to each group member (e.g., 205, 250, 260, 270), and also sends a duplicate of the message 235 to the subscriber 200.

Step 440 also comprises an act 420 of receiving a group message from the subscriber. Act 420 includes receiving a group message from the subscriber that is directed to the group list. For example, based on the trust relationship, the subscriber 200 can send a message 245 that is directed to a group list 210. In one implementation, the message 245 is received at a group list server; while in another implementation, the message 245 is not subject to challenge until it reaches, for example, a message interface at the individual group member's computer system.

FIG. 5 further shows that step 440 comprises an act 430 of challenging the group message from the subscriber for all non-trusted group members. Act 430 includes challenging the group message from the subscriber for all non-trusted group members, such that non-trusted group members only receive the group message from the subscriber with group member intervention, and such that trusted group members receive the group message from the subscriber without intervention. For example, as shown in FIG. 3C, since group member Aaron 205 is the only group member of group 210 to have generated a trust relationship with the subscriber 200, only group member Aaron 205 will receive the message 245 without challenge, while group members 240, 250, 260, and 270 will each refuse the message 245 unless the subscriber 200 also passes an additional challenge and response with those corresponding group members.

Accordingly, implementations of the present invention provide a wide range of flexibility for distributing group messages inside and outside of group lists. Furthermore, implementations of the present invention provide increased efficiency for distributing group messages that are also appropriate to be viewed by group non-members. In addition, implementations of the present invention allow group messages to be distributed to group non-members only on a trusted basis, thereby improving distribution techniques without significantly limiting issues associated with receiving and delivering unsolicited messages.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method, comprising:
   establishing, using at least one processor, a group that includes a plurality of group members, wherein membership in the group establishes a first trust level among the plurality of group members that enables each of the plurality of group members to send and/or receive group messages without a trust challenge;
   establishing a second trust level between one or more subscribers that are not one of the plurality of group members and the group;
   receiving a message from a sender that is intended for the group;
   determining a trust level between the sender and the group based on whether the sender is a group member or a subscriber;
   in response to the sender being a group member and the trust level between the sender and the group is the first trust level, sending the message to the group members;
   in response to the sender being a subscriber and the trust level between the sender and the group is the second trust level, determining if a trust relationship exists between the sender and each member of the group,
   if no trust relationship exists between a particular member of the group and the sender, delivering the message to the particular member of the group only if the sender passes a trust challenge; and
   if a trust relationship exists between the particular member of the group and the sender, delivering the message to the particular member of the group without the trust challenge; and
   in response to the sender being neither a group member nor a subscriber and there is no trust level between the sender and the group, blocking the message from being delivered to the group.

2. The method of claim 1, wherein establishing the second trust level between the one or more subscribers and the group comprises establishing the second trust level between at least one subscriber and at least one of the plurality of group members.

3. The method of claim 2, wherein the at least one of the plurality of group members is a member of a plurality of groups, and wherein establishing the second trust level between the one or more subscribers and the at least one of the plurality of group members comprises establishing a limited trust relationship that establishes a trust level between at least one subscriber and less than all of the plurality of groups.

4. The method of claim 1, wherein the first trust level enabling each of the plurality of group members to send and/or receive group messages includes enabling each of the plurality of group members to send and/or receive messages to or from the group generally.

5. The method of claim 4, wherein sending and/or receiving messages to or from the group generally comprises sending and/or receiving messages to or from a group address that is associated with the group.

6. The method of claim 1, wherein the first trust level enabling each of the plurality of group members to send and/or receive group messages includes enabling each of the plurality of group members to send and/or receive messages to or from others of the plurality of group members.

7. The method of claim 1, wherein establishing the second trust level between the one or more subscribers and the group comprises verifying that a network address associated with the one or more subscribers is one or both of valid or trusted.

8. The method of claim 1, wherein the group is associated with default subscriber receive privileges, and wherein the default subscriber receive privileges are applied to the second trust level.

9. The method of claim 1, wherein the group is associated with default subscriber accept privileges, and wherein the default subscriber accept privileges are applied to the second trust level.

10. The method of claim 1, wherein the group comprises a first group and wherein the one or more subscribers comprises a second group, and wherein establishing the second trust level comprises establishing a reciprocal trust relationship between the first group and the second group.

11. A computer program product comprising one or more non-transitory computer-readable storage media having stored thereon computer-executable instructions that, when executed by one or more processors of a computer system, cause the computer system to implement a method, comprising:
  establishing a group that includes a plurality of group members, wherein membership in the group establishes a first trust level among the plurality of group members that enables each of the plurality of group members to send and/or receive group messages without a trust challenge;
  establishing a second trust level between one or more subscribers that are not one of the plurality of group members and the group;
  receiving a message from a sender that is intended for the group;
  determining a trust level between the sender and the group based on whether the sender is a group member or a subscriber;
  in response to the sender being a group member and the trust level between the sender and the group is the first trust level, sending the message to the group members;
  in response to the sender being a subscriber and the trust level between the sender and the group is the second trust level, determining if a trust relationship exists between the sender and each member of the group,
  if no trust relationship exists between a particular member of the group and the sender, delivering the message to the particular member of the group only if the sender passes a trust challenge; and
  if a trust relationship exists between the particular member of the group and the sender, delivering the message to the particular member of the group without the trust challenge; and
  in response to the sender being neither a group member nor a subscriber and there is no trust level between the sender and the group, blocking the message from being delivered to the group.

12. The computer program product of claim 11, wherein establishing the second trust level between the one or more subscribers and the group comprises establishing the second trust level between at least one subscriber and at least one of the plurality of group members.

13. The computer program product of claim 12, wherein the at least one of the plurality of group members is a member of a plurality of groups, and wherein establishing the second trust level between the one or more subscribers and the at least one of the plurality of group members comprises establishing a limited trust relationship that establishes a trust level between at least one subscriber and less than all of the plurality of groups.

14. The computer program product of claim 11, wherein the first trust level enabling each of the plurality of group members to send and/or receive group messages includes enabling each of the plurality of group members to send and/or receive messages to or from the group generally.

15. The computer program product of claim 11, wherein the first trust level enabling each of the plurality of group members to send and/or receive group messages includes enabling each of the plurality of group members to send and/or receive messages to or from others of the plurality of group members.

16. The computer program product of claim 11, wherein establishing the second trust level between the one or more subscribers and the group comprises verifying that a network address associated with the one or more subscribers is one or both of valid or trusted.

17. The computer program product of claim 11, wherein the group is associated with default subscriber receive privileges, and wherein the default subscriber receive privileges are applied to the second trust level.

18. The computer program product of claim 11, wherein the group is associated with default subscriber accept privileges, and wherein the default subscriber accept privileges are applied to the second trust level.

19. The computer program product of claim 11, wherein the group comprises a first group and wherein the one or more subscribers comprises a second group, and wherein establishing the second trust level comprises establishing a reciprocal trust relationship between the first group and the second group.

20. A computer system, comprising: one or more processors; and one or more non-transitory computer-readable media having stored thereon computer-executable instructions that, when executed by the one or more processors, cause the computer system to implement a method, comprising:
  establishing a group that includes a plurality of group members, wherein membership in the group establishes a first trust level among the plurality of group members that enables each of the plurality of group members to send and/or receive group messages without a trust challenge;
  establishing a second trust level between one or more subscribers that are not one of the plurality of group members and the group;
  receiving a message from a sender that is intended for the group;
  determining a trust level between the sender and the group based on whether the sender is a group member or a subscriber;
  in response to the sender being a group member and the trust level between the sender and the group is the first trust level, sending the message to the group members;
  in response to the sender being a subscriber and the trust level between the sender and the group is the second trust level, determining if a trust relationship exists between the sender and each member of the group,
  if no trust relationship exists between a particular member of the group and the sender~delivering the message to the particular member of the group only if the sender passes a trust challenge; and if a trust relationship exists between the particular member of the group and the sender, delivering the message to the particular member of the group without the trust challenge; and in response to the sender being neither a group member nor a subscriber and there is no trust level between the sender and the group, blocking the message from being delivered to the group.

* * * * *